R. S. HALL.
SIGNAL FOR MOTOR VEHICLES.
APPLICATION FILED OCT. 18, 1920.
1,381,918.
Patented June 21, 1921.
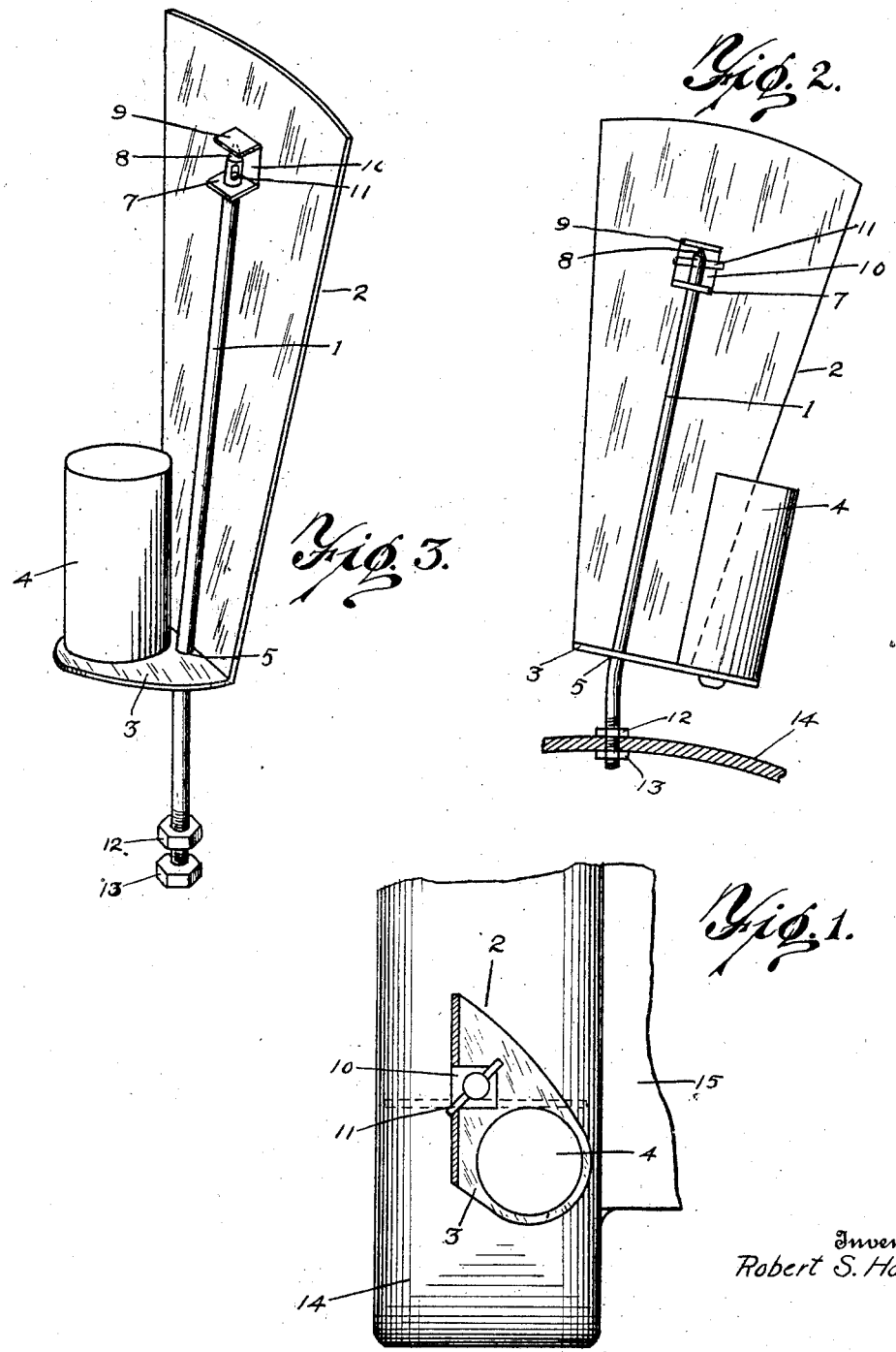
Inventor
Robert S. Hall
By Whittemore Hulbert & Whittemore
Attorneys

UNITED STATES PATENT OFFICE.

ROBERT S. HALL, OF DETROIT, MICHIGAN.

SIGNAL FOR MOTOR-VEHICLES.

1,381,918.  Specification of Letters Patent.  Patented June 21, 1921.

Application filed October 18, 1920. Serial No. 417,593.

*To all whom it may concern:*

Be it known that I, ROBERT S. HALL, a citizen of the United States of America, residing at Detroit, in the county of Wayne and State of Michigan, have invented certain new and useful Improvements in Signals for Motor-Vehicles, of which the following is a specification, reference being had therein to the accompanying drawings.

The invention relates to signals for vehicles and is designed particularly for use upon motor vehicles. It is an object of the invention to provide a signal which is simple in construction and sensitive in operation, and which will automatically indicate to the driver of a following vehicle change in speed of the vehicle upon which it is mounted. Other objects of the invention reside in the novel features of construction and combinations and arrangements of parts as more fully hereinafter set forth.

In the drawings;

Figure 1 is a sectional elevation of a signal embodying my invention and applied to a vehicle;

Fig. 2 is a side elevation of the signal showing its manner of attachment to the vehicle;

Fig. 3 is a perspective view of the signal.

1 is a rod forming a pivotal support for the indicating blade 2 which is provided at its lower end with the transversely extending flange 3 carrying the weight 4. The rod 1 passes through the aperture 5 in the flange 3 and through the aperture 6 in a second flange 7 near the upper end of the blade, while the upper end of the rod 1, which is preferably pointed as at 8, contacts with a third flange 9 upon the blade. This pointed upper end 8 of the rod is free to find its seat upon the third flange and consequently reduces to the minimum the friction to rotation since it cannot bind. The flanges 7 and 9 are struck out from the blade 2, which is preferably formed of sheet metal, to form the aperture 10 therein and a stop 11 upon the rod 1 which is formed by a pin passing therethrough, extends through the aperture to limit the rotation of the blade relative to the rod to substantially 90°.

The lower end of the supporting rod 1 is threaded and is adapted to be engaged by the nuts 12 and 13 so that to attach the signal to a vehicle the rod may be passed through an aperture in the desired part of the vehicle, such as the fender 14, and the nuts 12 and 13 then screwed toward each other to securely clamp the signal in place. This signal is preferably located upon the rear fender on the left hand side of the vehicle and adjacent to the body 15 thereof so that both sides of the blade 2 may have the same color, as red, without interfering with the indicating functions. The supporting rod 1 is bent rearwardly between the fender and the blade to the desired angle and the stop 11 is adapted to engage one edge of the aperture 10 in the blade to hold the blade parallel to the direction of travel of the vehicle when the parts are in their normal positions, but upon retardation of the speed of the vehicle, the indicating blade will be rotated due to the inertia of the weight 4 until the blade occupies the position shown in dotted lines in Fig. 1 where the opposite edge of the aperture 10 is engaged by the stop and the blade extends transversely of the direction of travel of the vehicle to plainly indicate to the driver of the following vehicle that the vehicle upon which the signal is mounted is slowing down.

With the above construction the path of rotation of the indicating member is inclined to the horizontal to normally maintain the signal in its desired position, but at the same time permit of a high degree of sensitiveness of the signal and of the signal remaining exposed for a longer period of time than where a weighted member swings through a substantially vertical path. Furthermore, the signal comprises but few parts which can be readily and cheaply manufactured.

What I claim as my invention is:

1. In a signal for vehicles, the combination with a support, of an indicating member rotatably mounted on said support and normally occupying a predetermined position relative to said support, said indicating member being unbalanced to rotate from its normal position due to its inertia upon change of speed of the vehicle.

2. In a signal for vehicles, the combination with a support, of an unbalanced indicating member rotatably mounted on said support, the path of rotation of said indicating member being inclined to the horizontal and said indicating member normally occupying a predetermined position and being rotatable from said position due to its inertia upon change of speed of the vehicle.

3. In a signal for vehicles, the combination with a supporting rod, of an indicating member pivotally mounted upon said rod with its pivot inclined relative to the vertical, said indicating member being unbalanced to rotate due to its inertia upon change of speed of the vehicle, and means for limiting the rotation of said indicating member.

4. In a signal for vehicles, the combination with an upwardly extending rod, of an indicating member, apertured projections upon said indicating member through which said rod passes, a projection upon said indicating member rotatably engaging the upper end of said rod, and a weight upon one of said projections offset from said rod.

5. In a signal for vehicles, the combination with an upwardly extending inclined supporting rod, of an apertured indicating blade, apertured flanges upon said blade through which said rod passes, a flange upon said blade rotatably engaging the upper end of said rod, a weight upon one of said flanges offset from said rod to rotate about said rod due to inertia upon change of speed of the vehicle and a stop upon said rod and extending through the aperture in said blade to limit the rotation of said blade.

6. In a signal for vehicles, the combination with an upwardly and rearwardly extending supporting rod, an apertured indicating blade, apertured flanges upon said blade through which said rod passes, a flange upon said blade freely rotatably engaging the upper end of said rod, a weight upon one of said flanges offset from said rod to rotate thereabout due to inertia upon retardation of the speed of the vehicle and a stop upon said rod and extending through the aperture in said blade, said stop normally holding said blade parallel to the direction of movement of the vehicle and arranged to limit the rotation of said blade to extend transversely of the direction of movement of the vehicle.

In testimony whereof I affix my signature.

ROBERT S. HALL.